Patented Oct. 24, 1939

2,176,881

UNITED STATES PATENT OFFICE 2,176,881

PROCESS OF PRESERVING RUBBER AND PRODUCT

Samuel G. Burroughs, Pittsburgh, Pa., assignor to Pennsylvania Coal Products Company, a corporation of Pennsylvania No Drawing. Application May 23, 1935, Serial No. 23,018. Renewed May 23, 1939

14 Claims. (Cl. 260—810)

The invention relates to a rubber compound and the process of making the same. It has for its objects the production of a compound which is resistant to oxidation and discoloration.

To accomplish the foregoing result, the following procedure setting forth in detail certain illustrative embodiments is practiced, these being indicative, however, of a limited number of the various ways in which the invention may be employed.

In accordance with the invention, there is incorporated in the rubber compound (which includes the usual fillers, vulcanizing agents and accelerators), a small amount of an aromatic compound of the character of hydroxy spiro hydroindene, or hydroxy spiro indane as it may preferably be designated in accordance with the nomenclature system of "Chemical Abstracts" of the American Chemical Society. Such compounds are characterized in general by a more or less complex structure presenting unsaturated ring nuclei with hydroxyls, and saturated ring structure joining the unsaturated nuclei. These compounds and the methods involved in their preparation are described in various publications, among which are a paper by Fabrinyi and Szeky, Berichte der Deutschen Chemischen Gesellshaft, vol. 38, 2307 (1905) and in an article by Baker, Journal of Chemical Society (London) 1934, 1678.

Among such hydroxy spiro indanes are, for instance, the alkyl hydroxy spiro indanes, and particularly alkyl tetrahydroxy spiro indanes, as for hydroxy 1,1' spiro bis-indan; 3, 3, 3', 3' tetrahydroxy 1, 1' spiro bisindan; 3, 3, 3', 3' tetramethyl 6, 6', 7, 7' tetrahydroxy 1, 1' spiro bisindan; 3, 3, 3', 3' tetramethyl 4, 4', 5, 5' tetrahydroxy 1, 1' spiro bis-indan; 3, 3, 3', 3' tetramethyl 4, 6, 4', 6' tetrahydroxy 1, 1' spiro bis-indan; 3, 3, 3', 3' tetramethyl 5, 7, 5', 7' tetrahydroxy 1, 1' spiro bis-indan; 3, 3, 3', 3' tetramethyl 4, 5, 6, 4', 5', 6' hexahydroxy 1, 1' spiro bis-indan; 3, 3, 3', 3' tetramethyl 5, 6, 7, 5', 6', 7' hexahydroxy 1, 1' spiro bis-indan; 3, 3, 3', 3' tetramethyl 5, 5' dihydroxy 6, 6' dimethoxy 1, 1' spiro bis-indan; 3, 3, 3', 3' tetramethyl 5, 5' dimethoxy 6, 6' dihydroxy 1, 1' spiro bis-indan. Representatively, the 3, 3, 3', 3' tetramethyl 5, 6, 5', 6' tetrahydroxy 1, 1' spiro bis-indan is apparently of the formula

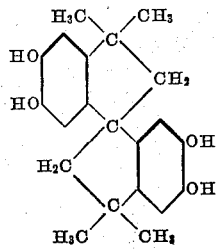

or at least such structural concept is warranted by the evidence now had. The melting point of the particular compound just mentioned is about 315 deg. C., with some tendency to decomposition, and it is freely soluble in acetone, moderately soluble in alcohol and chloroform, slightly soluble in gasoline and the like, sufficiently so for stabilizing purposes, and practically insoluble in water. Physically it is colorless to light fawn color and finely crystalline.

Briefly stated, the method of using the agent will be clear from the following example, it being understood that such example is merely illustrative and that the invention is applicable to all kinds of rubber compounds employing a wide variety of fillers, vulcanizing agents, accelerators and the like. A rubber compound is made up in the usual manner well known in the art and consisting of the following materials, 50 parts pale crepe rubber, 25 parts zinc oxide, 1½ parts sulphur, ½ part diphenyl guanidine, and 1 part of one of the hydroxy spiro indanes heretofore set forth. The compound may be vulcanized by any of the known methods, thus completing the process. The amount of the hydroxy spiro indane employed may vary within a considerable range depending on conditions, the one part specified being in most cases the upper limit required.

The hydroxy spiro indane compounds as herein described, act as antioxidants, and reduce discoloration in sunlight to a minimum. The use of the agent as compared with other known antioxidants reduces peaks in the tensile curve and permits a much more prolonged overcure without seriously affecting the tensile strength and elongation of the aged product. Further, when the agent is used, the product on sun exposure test, exhibits practically no discoloration, thus involving a marked advantage over other known antioxidants which in all cases produce marked discoloration when rubber products containing them are exposed to severe sun exposure tests. The agent is, therefore of particular value in the manufacture of white or lightly tinted rubber articles.

What I claim is:

1. A process of preventing oxidation and discoloration of rubber which comprises incorporating therein a small amount of a tetramethyl hydroxy spiro bis-indane wherein the methyl groups are attached to the saturated rings and the hydroxy groups to the aromatic rings.

2. A process of preventing oxidation and discoloration of rubber which comprises incorporating therein a small amount of 3, 3, 3', 3' tetramethyl 5, 6, 5', 6' tetrahydroxy 1, 1' spiro bis-indan.

3. A process of preventing oxidation and discoloration of rubber which comprises incorporating therein a small amount of 3, 3, 3', 3' tetramethyl 4, 6, 4', 6' tetrahydroxy 1, 1' spiro bis-indan.

4. A process of preventing oxidation and discoloration of rubber which comprises incorporating therein a small amount of 3, 3, 3', 3' tetramethyl 4, 5, 6, 4', 5', 6' hexahydroxy 1, 1' spiro bis-indan.

5. A composition containing rubber and a small amount of a tetramethyl hydroxy spiro bis-indane wherein the methyl groups are attached to the saturated rings and the hydroxy groups to the aromatic rings.

6. A composition containing rubber and a small amount of 3, 3, 3', 3' tetramethyl 5, 6, 5', 6' tetrahydroxy 1, 1' spiro bis-indan.

7. A composition containing rubber and a small amount of 3, 3, 3', 3' tetramethyl 4, 6, 4', 6' tetrahydroxy 1, 1' spiro bis-indan.

8. A composition containing rubber and a small amount of 3, 3, 3', 3 tetramethyl 4, 5, 6, 4', 5', 6' hexyhydroxy 1, 1' spiro bis-indan.

9. The process of preventing oxidation and discoloration of rubber, comprising incorporating in the rubber a small amount of an alkyl hydroxy spiro bis-indane wherein the alkyl groups are attached to the saturated rings and the hydroxy groups to the aromatic rings.

10. A composition containing rubber and a small amount of an alkyl hydroxy spiro bis-indane, wherein the alkyl groups are attached to the saturated rings and the hydroxy groups to the aromatic rings.

11. The process of preventing oxidation and discoloration of rubber, comprising incorporating in the rubber a small amount of an alkyl hydroxy spiro bis-indane, wherein the alkyl groups are attached to the saturated rings and the hydroxy groups to the aromatic rings and vulcanizing the mixture.

12. The process of preventing oxidation and discoloration of rubber, comprising incorporating in the rubber a small amount of a tetramethyl hydroxy spiro bis-indane, wherein the methyl groups are attached to the saturated rings and the hydroxy groups to the aromatic rings and vulcanizing the mixture.

13. The process of preventing oxidation and discoloration of rubber, comprising incorporating in the rubber a small amount of an alkyl tetrahydroxy spiro bis-indane, wherein the alkyl groups are attached to the saturated rings and the hydroxy groups to the aromatic rings and vulcanizing the mixture.

14. The process of preventing oxidation and discoloration of rubber, comprising incorporating in the rubber a small amount of an alkyl hexahydroxy spiro bis-indane, wherein the alkyl groups are attached to the saturated rings and the hydroxy groups to the aromatic rings and vulcanizing the mixture.

SAMUEL G. BURROUGHS.